2 Sheets—Sheet 1
J. A. KNAPP.
Photographic-Lenses.
No. 212,099. Patented Feb. 11, 1879.
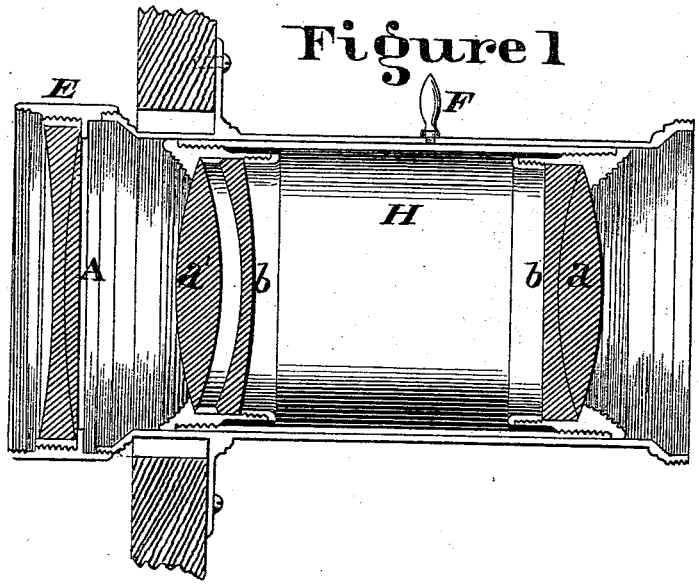
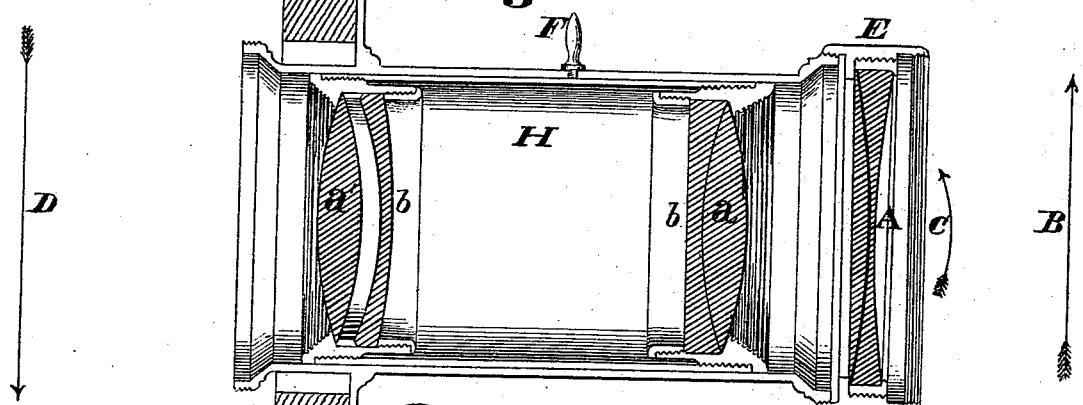
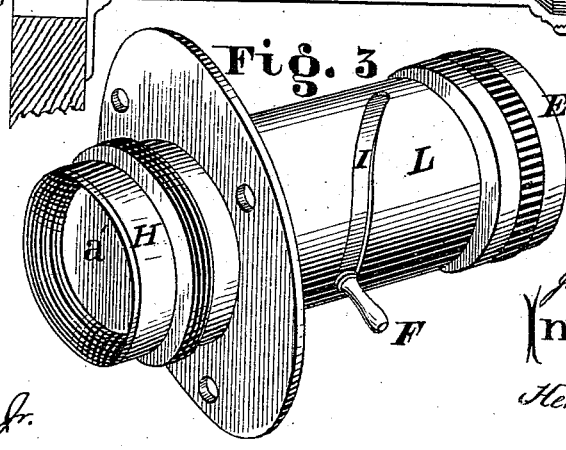
Attest
E. G. Dewald.
Theo. G. Richter, Jr.
Inventor
John A. Knapp
by Henry Millward
atty.

J. A. KNAPP.
Photographic-Lenses.

No. 212,099.    Patented Feb. 11, 1879.

Attest
E. J. Dewald.
Theo. G. Richter, Jr.

Inventor
John A. Knapp
by
Henry Millward
Att'y

UNITED STATES PATENT OFFICE.

JOHN A. KNAPP, OF NEWPORT, KENTUCKY, ASSIGNOR TO HIMSELF,
F. WILLIAM KAMPING, AND ROBERT Y. SPRING, OF SAME PLACE.

IMPROVEMENT IN PHOTOGRAPHIC LENSES.

Specification forming part of Letters Patent No. 212,099, dated February 11, 1879; application filed June 24, 1878.

*To all whom it may concern:*

Be it known that I, JOHN A. KNAPP, of Newport, in the county of Campbell and State of Kentucky, have invented certain new and useful Improvements in Photographic Lenses, of which the following is a specification:

This improvement has reference to photographic lenses.

It consists in placing an additional lens in front of an ordinary portrait-lens, and is so arranged, shaped, and constructed as to change the usual result of a curved field into a flat field, and also obviates other faults incident to spherical lenses, such as spherical aberration and distortion. With this improved lens a small instrument is made to do the work of the largest instrument made.

It consists, also, in a new device for focusing, whereby the inner sleeve, to which the ordinary lenses are attached, is made to move inwardly by means of a screw-shaped slot in the exterior sleeve, and a projecting handle connected to the inner sleeve and operating in said slot. By this means of focusing all liability of changing the focus when the light-excluding cap is placed over or taken off the end of the lens is entirely obviated, as the outer sleeve remains stationary at all times.

Figure 5:
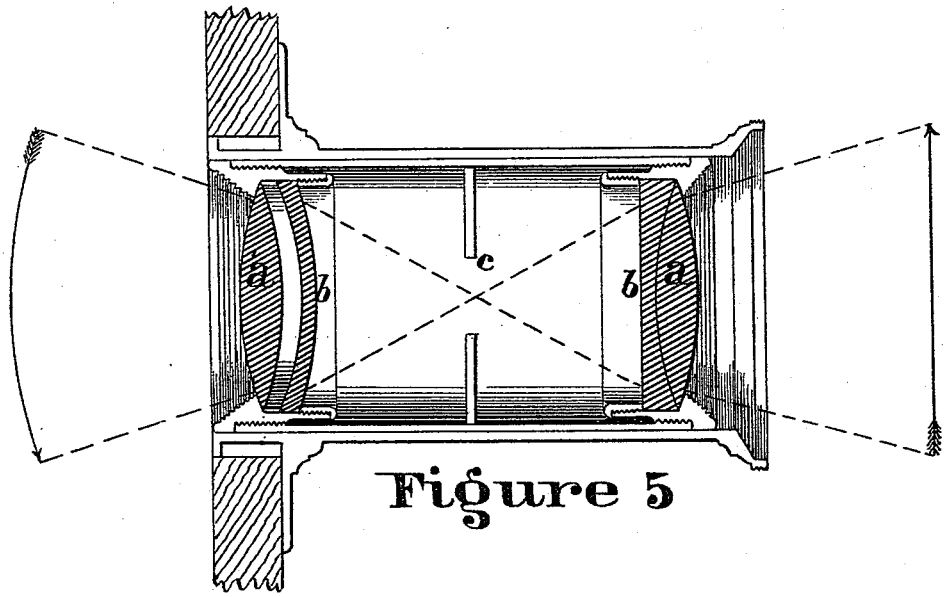
Figure 2:
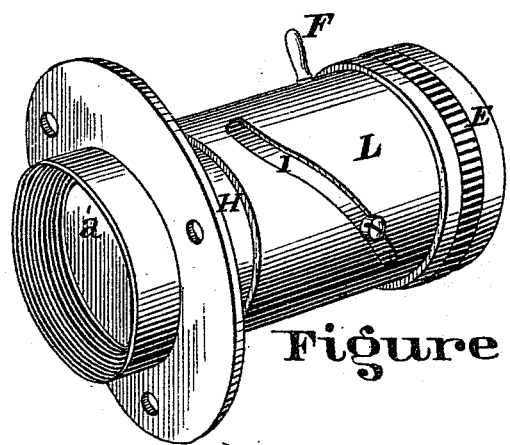
Figure 6:
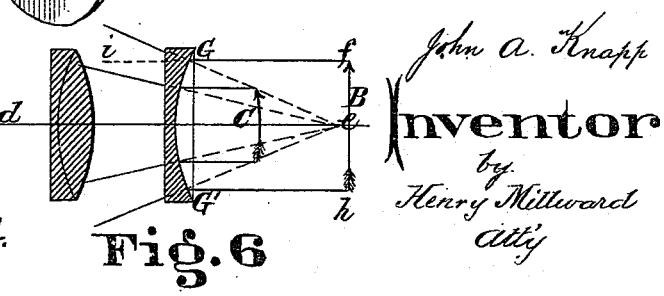

In the accompanying drawings, Figure 1 is a longitudinal sectional elevation of an ordinary photographic lens, with my additional lens attached at the rear end thereof. Fig. 2 is a perspective view of the same, with the additional lens shown as attached in front, the preferred location for it. This figure also shows a modification of my new focusing device. Fig. 3 shows the focusing device arranged in the preferred manner. Fig. 4 is a longitudinal section of the same, and represents the additional lens as plano-concave and made achromatic. The concave side is shown toward the object, which it should be when used on round objects or for portraiture, as it causes more globular distortion to counteract the distortion of the other lenses. When used as a view-lens it should be reversed. Fig. 5 is a sectional elevation of an ordinary photographic lens, with arrows representing the object before and after passing through the lens, the curved arrow showing the object as it would appear at its true focal position; and Fig. 6 is used as an example, and will be referred to hereinafter.

Letters of like character represent corresponding parts in each of the figures.

The ordinary photographic lens (shown by Fig. 5) consists of two bi-convex crown-glass lenses, $a\ a'$, and two negative flint lenses, $b\ b'$, the front plano-concave and the back negative meniscus, with a diaphragm, C, located at a point in the lens where the rays or pencils of light cross each other on the axis or optical center.

In Fig. 4 the additional lens A is represented as located a short distance in front of lens $a$; and the arrows B, C, and D represent the different configurations of an object before and after passing through a photographic lens with my additional lens attached thereto. The object being flat, as indicated by arrow B, when acted upon by the lens it is formed in front of the lens A in a curved shape of reduced dimensions, as shown at C, from whence it is transmitted, through the ordinary photographic lens, to the negative plate, where again it is flat, as indicated by arrow D. By this combination, a small lens—for example, a half-size portrait—can be made to do the work of an 8/4, and, under favorable conditions as to light and rapidity of chemicals, of a mammoth-sized lens, on the same principle of a small copying-tube, which, when attached to a box sufficiently large, can enlarge a small locket-picture to any size, the size of the copied picture depending on the distance of ground glass from the lens; and this combination-lens is on this principle. The front or additional lens reduces the object and brings it within the scope of a small lens, and a much larger field of view is obtained, and the size of the picture is dependent only on the distance of ground glass from lens.

The lens A is secured to a thimble, E, which is provided with corresponding female threads at each of its ends, for the more ready transposition of the lens A from concave to plano side out. A handle, F, is secured to the inner sliding tube, H, and in moving through curved slot I causes the said inner tube, H, to move to or from the lens A, according as the handle F is moved upward or downward, and at the same time the exterior tube, L, remains fixed. By this means a more delicate focusing device is attained, and the difficulty often experienced—that of changing focus when the light-excluding cap is put over the end E—is entirely obviated, and the lenses are kept well centered, and not so liable to get out of order.

In the example Fig. 6, a plano-concave lens, G G′, is shown. This lens, when intended for use, as at A, Figs. 1 and 4, should be made achromatic. A negative meniscus or a double-concave lens may be substituted for a plano-concave; but I prefer the plano-concave. If G and G′ be a plano-concave lens, (see Fig. 6,) and $d\ e$ the axis, let the ray G $f$ fall upon the lens at G, and it will be refracted in passing through the glass, and diverge from the direct line G $i$ into G $e$, approaching toward the perpendicular of the concave side. The ray G′, being equidistant from line $d\ e$, will diverge in the same manner, as well as the rest of the intermediate rays in proportion to their distance from the axis of the lens; and the arrow B, curved and reduced in dimensions, is reproduced, as shown at C, and is transmitted through the lens in the manner indicated by arrow D.

Having thus described my invention, what I claim as new, and desire to secure by Letters Patent, is—

1. In combination with the lenses of an ordinary photographic-portrait combination-lens, an additional plano-concave lens, located in front of the forward lens of the combination, substantially as and for the purposes specified.

2. In a photographic lens, the focusing device consisting of the tubes H L, curved slot I, and handle F, substantially as and for the purpose specified.

In testimony whereof I have hereunto set my hand this 1st day of May, 1878.

J. A. KNAPP.

Witnesses:
HENRY MILLWARD,
ED. DEWALD.